Sept. 6, 1932.  D. L. GALLUP  1,875,374

BRAKE

Filed July 9, 1930

INVENTOR.
DAVID L. GALLUP
BY
*M. W. McConkey*
ATTORNEY

Patented Sept. 6, 1932

1,875,374

UNITED STATES PATENT OFFICE

DAVID L. GALLUP, OF SOUTH BEND, INDIANA, ASSIGNOR TO BENDIX BRAKE COMPANY, OF SOUTH BEND, INDIANA, A CORPORATION OF ILLINOIS

BRAKE

Application filed July 9, 1930. Serial No. 466,664.

This invention relates to brakes and more particularly to shoes.

Heretofore, great difficulty has been experienced in the matter of replacing repairs to shoes and particularly in the replacement of friction linings therefor because of the substitution of linings of inferior grade for standard linings manufactured solely for shoes of a particular structure. It is the aim of the present invention to overcome these difficulties.

An object of the invention is to provide a brake shoe having a rim and an interconnected liner therefor.

Another object of the invention is to provide a brake shoe having a rim provided with deformed portions and a liner therefor conforming to the deformations of the rim.

Another object of the invention is to provide a brake shoe having a rim punched or otherwise deformed and a liner for the rim having raised or depressed portions conforming to the deformations of the rim.

A further object of the invention is to provide a brake shoe and a lining therefor, the shoe and the lining having interlocking portions adapted to take the torsional stresses imposed thereon.

An additional object of the invention is to provide a brake shoe and an interlocking lining therefor which will be simple and inexpensive in structure, highly efficient in use, positive in action, durable in service and a general improvement in the art.

Other objects of the invention will appear from the following description taken in connection with the drawing, which forms a part of this specification, and in which.

Figure 1:
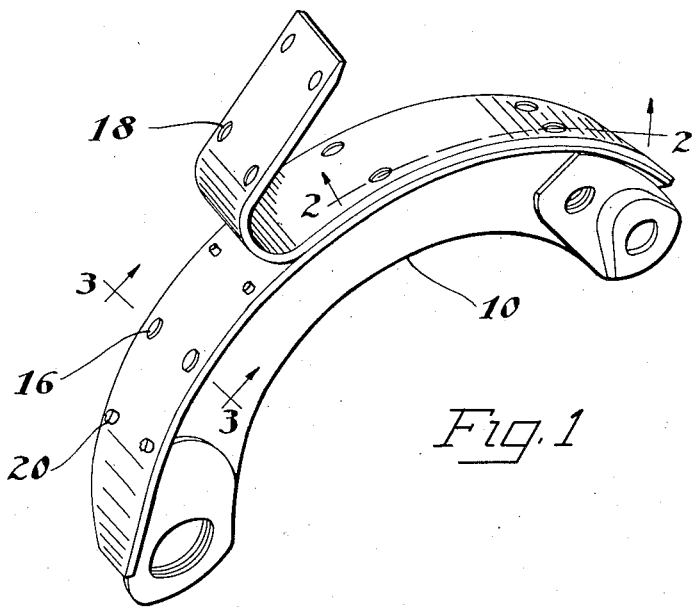
Figure 1 is a perspective view of a brake shoe illustrating a friction lining partly secured to the rim of the shoe.
Figure 2:
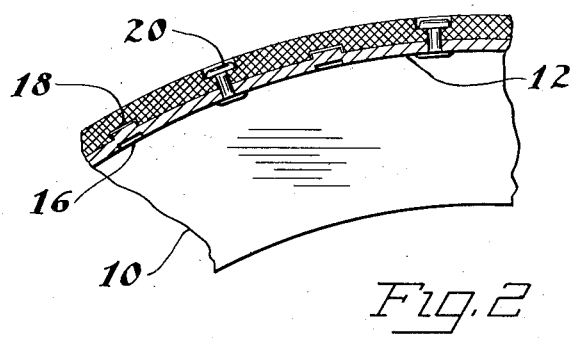
Figure 2 is a sectional view substantially on line 2—2, Figure 1.
Figure 3:
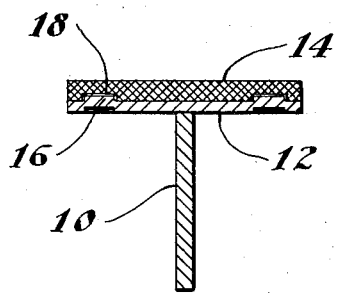
Figure 3 is a sectional view substantially on line 3—3, Figure 1.

Referring to the drawing for more specific details of the invention, 10 represents the web of a brake shoe. This web may be of any conventional type adapted to support a rim 12 which may be secured thereto as by welding. The rim is punched or otherwise deformed to provide an irregular face or bearing surface for a friction lining 14. As shown, the rim 12 is punched from the back to provide a plurality of bosses or lugs 16 arranged in parallel rows and in spaced relation with respect to each other.

The brake shoe lining 14 is especially designed and prepared for the shoe. This lining has formed on its back a plurality of recesses or depressions 18 adapted to register with and receive the bosses 16 and, as shown, the lining is secured to the rim as by rivets 20 arranged in spaced relation with respect to each other and alternating with the lugs or bosses on the face of the rim.

By reason of the particular structure or character of the brake shoe rim, a particular type or structure of friction lining becomes necessary in the matter of replacement of the lining since, owing to the deformation of the rim, no other lining can be substituted and give the desired braking effect. Furthermore, the rim and the lining are so constructed that the interlocking portions of these elements effectively resist the torsional stresses imposed thereon.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake shoe comprising a web, a rim secured thereto, bosses arranged on the rim in parallel rows, a liner for the rim having depressions receiving the bosses and means arranged alternately with the bosses for securing the liner on the rim.

2. A brake shoe comprising a web, a rim secured thereto, bosses arranged on the rim in parallel rows, one row adjacent each edge of the rim, a liner for the rim having depressions receiving the bosses and means for securing the liner to the rim alternating with the bosses.

3. A brake shoe comprising a web, a rim secured thereto, bosses arranged on the rim adjacent the edges thereof, a liner for the rim having depressions receiving the bosses and rivets for securing the liner on the rim arranged in alternating relation with the bosses.

4. The method of manufacturing a brake shoe comprising stamping a strip, punching the strip to provide raised surfaces, bending the strip in an arc, securing a web thereto, forming a liner with depressions for receiving the raised surfaces and securing the liner to the rim.

5. The method of manufacturing a brake shoe comprising stamping a strip, punching the strip partially through to provide parallel rows of bosses, bending the strip in an arc, securing a web to the strip, forming a liner with depressions for the reception of the raised surfaces and riveting the liner to the rim between the raised surfaces.

In testimony whereof, I have hereunto signed my name.

DAVID L. GALLUP.